United States Patent [19]
Fratello

[11] Patent Number: 5,980,164
[45] Date of Patent: Nov. 9, 1999

[54] PNEUMATIC TUBE SYSTEM CARRIER

[75] Inventor: Daniel A. Fratello, Golden, Colo.

[73] Assignee: TransLogic Corporation, Denver, Colo.

[21] Appl. No.: 09/017,582

[22] Filed: Feb. 3, 1998

[51] Int. Cl.⁶ ................................................. B65G 51/06
[52] U.S. Cl. .......................................... 406/190; 406/186
[58] Field of Search .................................. 406/184, 185, 406/186, 187, 188, 189, 190

[56] References Cited

U.S. PATENT DOCUMENTS

| | | | |
|---|---|---|---|
| 726,022 | 4/1903 | Burton | 406/186 |
| 3,593,948 | 7/1971 | McClellan | 406/186 |
| 3,787,007 | 1/1974 | Alexandrov et al. | 406/190 X |
| 3,825,210 | 7/1974 | Weaver | 406/186 |
| 4,006,868 | 2/1977 | Hochradel et al. | 406/186 |
| 4,114,835 | 9/1978 | Alexandrov et al. | 406/190 |
| 4,324,511 | 4/1982 | Irish | 406/189 |
| 4,362,443 | 12/1982 | Mallory et al. | 406/188 |
| 4,470,730 | 9/1984 | Wuthrich | 406/186 |
| 4,941,777 | 7/1990 | Kieronski | 406/13 |
| 4,948,303 | 8/1990 | Good | 406/186 |
| 5,092,714 | 3/1992 | Porter et al. | 406/186 |
| 5,181,805 | 1/1993 | Grosswiller et al. | 406/189 |
| 5,181,806 | 1/1993 | Groswiller et al. | 406/189 |
| 5,181,807 | 1/1993 | Anders | 406/190 |
| 5,368,417 | 11/1994 | Benjamin et al. | 406/111 |
| 5,518,545 | 5/1996 | Miyano | 118/500 |
| 5,538,366 | 7/1996 | Piland et al. | 406/190 |
| 5,573,356 | 11/1996 | Henderson | 406/186 |
| 5,636,947 | 6/1997 | Valerino, Sr. et al. | 406/186 |
| 5,655,677 | 8/1997 | Fratello et al. | 220/4.22 |

OTHER PUBLICATIONS

Industrial Abrasives Division/3M, "Brushlon Products," Admitted As Prior Art (Published Prior To Feb. 3, 1997).

*Primary Examiner*—Andrew C. Pike
*Attorney, Agent, or Firm*—Holme Roberts & Owen LLP

[57] ABSTRACT

A carrier for use in a pneumatic tube transport system includes first and second shell members, at least a first hinge for pivotally interconnecting the first and second shell members such that the shell members can move relative to one another between open and closed positions, and at least a first seal band interconnected to at least one of fore and aft portions of the first and second shell members. At least the first seal band includes a plurality of fibers mountable on a first backing strip, the fibers having a modulus of elasticity of at least about $1 \times 10^5$ psi, being mounted perpendicularly relative to the first backing strip, and uniformly distributed on the first backing strip.

15 Claims, 4 Drawing Sheets

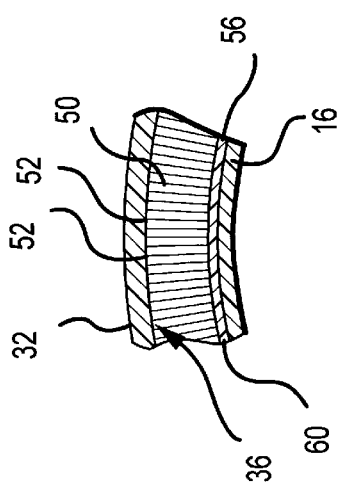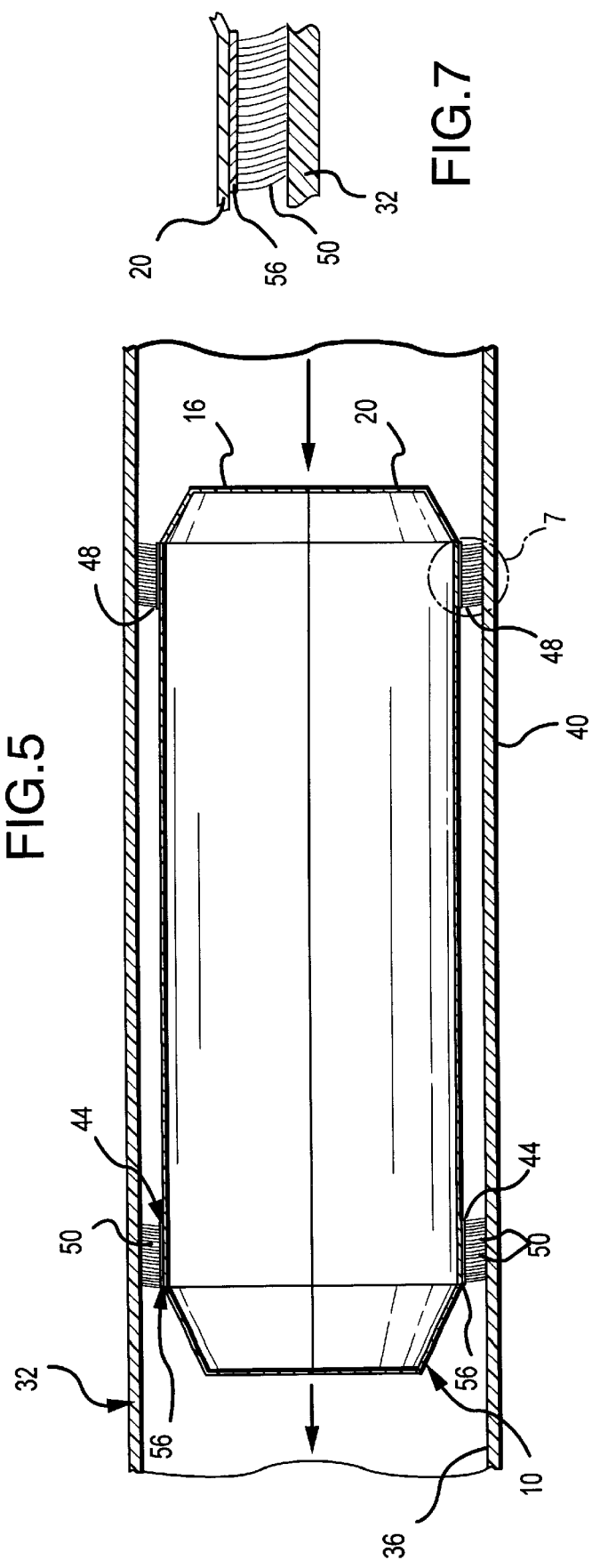

PNEUMATIC TUBE SYSTEM CARRIER

FIELD OF THE INVENTION

The present invention generally relates to carriers for use in pneumatic tube transport systems, and, in particular, to seal bands for carriers which can be used in pneumatic tube transport systems.

BACKGROUND OF THE INVENTION

Generally, pneumatic tube transport systems are used to transport or convey materials between discrete points or stations. Many products, documents, and other items may be placed in a carrier which is positionable within a number of substantially hermetically sealed tubes of the pneumatic tube transport system. The carrier may then be propelled through the tube by creating a zone of relatively higher pressure behind the carrier than in front of the carrier. This pressure differential may be accomplished by creating a vacuum or zone of negative pressure in front of the carrier or by creating a zone of positive pressure behind the carrier.

Accelerator rings or seal bands have been provided on carriers to prevent excessive mass transfer of air between the front of the carrier and the rear of the carrier. Such seal bands thus create differential pressure between the front and rear portions of a carrier, which provides the force necessary to propel the carrier through the pneumatic tube system. Such accelerator rings or seal bands typically engage the inner surface of the transport tube to support the carrier body and to inhibit air flow between the front and rear portions of the carrier. In this regard, it is important to minimize friction between the seal bands and the inner wall of the tube to enable the carrier to move through the tube without requiring high differential pressures between the front and rear of the carrier. Such a desire for minimizing friction must also be balanced with providing an adequate seal to inhibit mass transfer of air between the front and the rear of the carriers. In this regard, a "loose" seal band which does not provide a good seal may travel freely, but may also perform erratically for varying payloads within the carrier. On the other hand, while a "tight" seal will inhibit mass transfer of air between the front and rear portions of the carrier, friction forces between the seal band and tube may be high, thus requiring increased system pressures of the transport tube. Such tight seals may also generate an excessive amount of debris from wear on the seal bands, which can degrade performance of the tube transport system and/or components, such as blowers and optical sensors therein.

SUMMARY OF THE INVENTION

Accordingly, it is an object of the present invention to provide a carrier having a seal band which provides a sufficient seal to create an effective pressure differential between the front and rear portions of the carrier, the carrier being for use in a pneumatic tube transport system.

It is another object of the present invention to provide a carrier having a seal band which generates low friction forces to enable the carrier to move efficiently through a transport tube of a pneumatic tube transport system.

It is a further object of the present invention to provide a carrier for use in a pneumatic tube transport system, the carrier having a seal band which does not wear unevenly and which does not result in an excessive amount of contaminants.

The present invention accomplishes one or more of these objectives by providing a carrier having an improved seal band. Generally, the carrier includes generally cylindrical first and second shell members, a hinge means interconnectable to the first and second shell members for moving the first and second shell members relative to each other between open and closed positions, and at least a first seal band interconnected to at least one of the fore and aft portions of the first and second shell members, about at least a portion of the circumference of the first and second shell members. The first seal band supports the first and second shell members and minimizes fluid flow in at least a first tube of a pneumatic tube transport system from the fore portion to the aft portion of the first and second shell members to move the carrier through the first tube. Of importance, the first seal band includes a plurality of singular, stiff but bendable fibers mountable in a first backing strip, the plurality of fibers having a modulus of elasticity of at least about $1\times10^5$ pounds per square inch (psi). Advantageously, such fibers tend to remain substantially straight or erect, and do not flatten out after a period of extended use. In this regard, the fibers reduce wear and tear on the carrier, including the backing strip, and on the tube system as the singular, erect fibers do not tend to catch or snag upon tube joints or other protrusions within the tubes, even after prolonged use.

Such fibers generally have first and second end portions, the first end portions for frictionally engaging the inner wall of at least the first tube at a plurality of contact points, and the second end portions being mountable in the first backing strip, which is interconnectable to at least one of the first and second shell members. In this regard, the carrier and contents contained therein are supported by a plurality of stiff, yet bendable, erect fibers which are frictionally engageable with the inner wall of at least the first tube of the pneumatic tube transport system to support the first and second shells, as well as the contents contained therein, and to provide a sufficient seal to minimize mass flow of air from the rear of the carrier to the front of the carrier, which provides the motive force to move the carrier through at least the first tube of the pneumatic tube transport system. In addition, the plurality of fibers enhances transport efficiency (e.g., the ride) of a carrier through tubes of a pneumatic tube system and, in particular, over imperfections in a tube wall and/or joints between adjoining tubes, and since the fibers are stiff, yet bendable, which results in a smoother ride for the contents of the carrier (e.g., less impact forces or shock translated to the contents of the carrier).

In one embodiment of the seal bands of the present invention, the plurality of fibers of at least a first seal band are densely packed and uniformly distributed over the first backing strip. Such packing density and distribution provides multiple contact points with the inner wall of at least the first tube for inhibiting mass transfer of air between the fore and aft portions of the carrier, which creates an effective pressure differential between the fore and aft portions of the carrier to move the carrier through the tubes of the pneumatic tube transport system. Further, such packing density and uniform distribution of the plurality of fibers supporting the first and second shells and payload contained therein provides for a substantially even distribution of loading of the plurality of fibers. In this regard, due to the high packing density of fibers per square inch on the first backing strip and the uniform distribution of the fibers on the first backing strip, each of the plurality of fibers is substantially equally loaded. As a result, the plurality of fibers of the seal bands of the present invention tend to last longer than prior seal bands and tend to wear evenly. In one embodiment, the plurality of fibers have a diameter of less than about 0.010 inches, and, in a preferred embodiment, have a diameter of between about 0.003 inches and about 0.005 inches. Such fibers may be mounted on the first backing strip at a packing density of at least about 4000 fibers per square inch, and more preferably, at least about 10,000 fibers per square inch, and, in a preferred embodiment, between about 20,000 fibers per square inch and about 100,000 fibers per square inch. In such embodiments, the loading of individual fibers on the first backing strip is preferably below the critical buckling value.

For purposes of further enhancing support and minimizing mass transfer of fluid flow between the fore and aft portions of the carrier of the present invention, each of the plurality of fibers of the seal bands may be oriented between about 60° and about 90° relative to the first backing strip, and preferably substantially perpendicular relative to the first backing strip. In this regard, the plurality of fibers may be individually potted or otherwise interconnected (e.g., fastened or adhesively attached) to the first backing strip at a selected orientation (e.g., about 60° to about 90°) relative to the first backing strip. Alternatively, the plurality of fibers may be interconnected to the first backing strip in a brush-like manner (e.g., in clumps or bunches) for ease of manufacturing, the fibers in a selected clump being oriented between about 60° and about 90° relative to the first backing strip. Further, the fibers may have a substantially equal height from fiber to fiber, such that the first end portions of the plurality of fibers may substantially uniformly contact the inner wall of at least the first tube of a pneumatic tube transport system. In one embodiment, at least a first of the plurality of fibers has a length which is within about 0.1 inch, and more preferably, within about 0.01 inch of the length of a second of the plurality of fibers, and, in a preferred embodiment, within about 0.001 inch. For purposes of adequately supporting the shell members and contents enclosed therein, the fibers may have a length of less than about 0.5 inch, and preferably, less than about 0.3 inch, with a slenderness ratio, as defined by the ratio of the length of each fiber to the radius of gyration of each fiber, of less than about 300, and preferably, less than about 200.

In order to achieve the above-described advantages while providing a seal band which does not wear (e.g., shorten) as quickly as other seal bands, the fibers utilized in the present invention may be made from a synthetic or metallic material. Suitable fiber materials include synthetics, ceramics, metals, and any other material which can be made into short, thin fibers and which can be mounted to a backing strip or substrate. In one embodiment, each of the plurality of fibers comprises single strands fabricated from abrasive silicon carbide, abrasive aluminum oxide, solid nylon, hollow nylon, polypropylene, short trim polypropylene, polyurethane, organics, steel, aluminum or other comparable metals and synthetics can be shaped into relatively stiff fibers having the above-summarized lengths and diameters. Fibers fabricated from such materials are relatively durable. As such, the fibers do not produce an excessive amount of contaminants, which can effect the efficiency of the tube system and/or components therein. These fibers may be adhesively or mechanically attached to the first backing strip, which may be fabricated from synthetics, metals, organics, or any other material which is capable of structurally supporting a plurality of densely packed fibers and which is capable of being mounted to a cylindrical surface. As such, the material for at least the first backing strip may be flexible or workable to a circular configuration.

BRIEF DESCRIPTION OF THE DRAWINGS

FIG. 5 is an enlarged, end view of the seal band of the circled area 5 illustrated in FIG. 4;

FIG. 6 is a cross-sectional view of the carrier of the present invention positioned within the first tube of the pneumatic tube transport system, taken along line 6—6 of FIG. 4; and FIG. 7 is an enlarged, side view of the fibers of the seal band of the circled area 7 illustrated in FIG. 6.

DETAILED DESCRIPTION OF THE INVENTION

Figure 1:
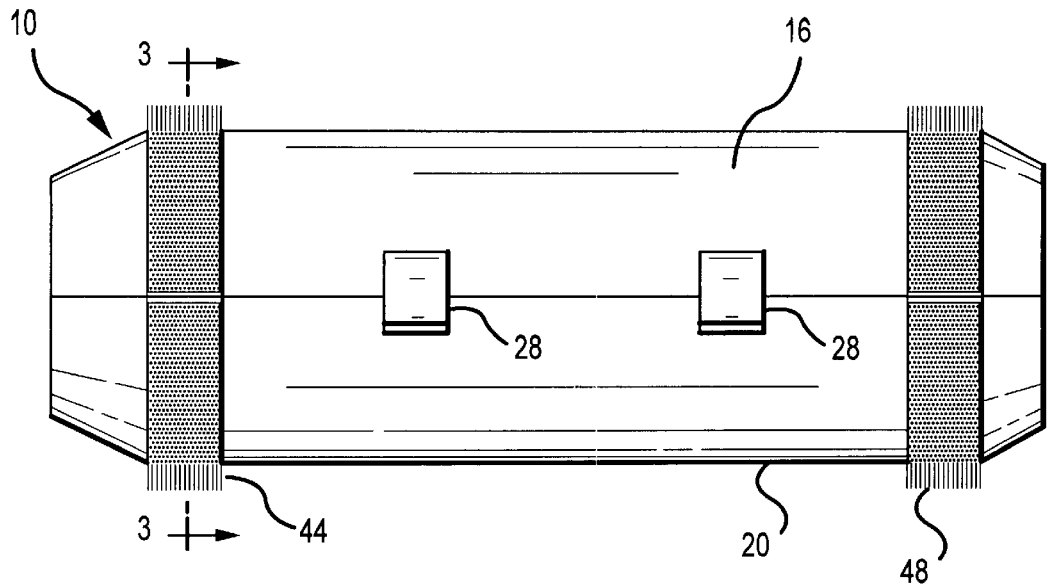
FIG. 1 illustrates a side view of a carrier of the present invention.
Figure 2:
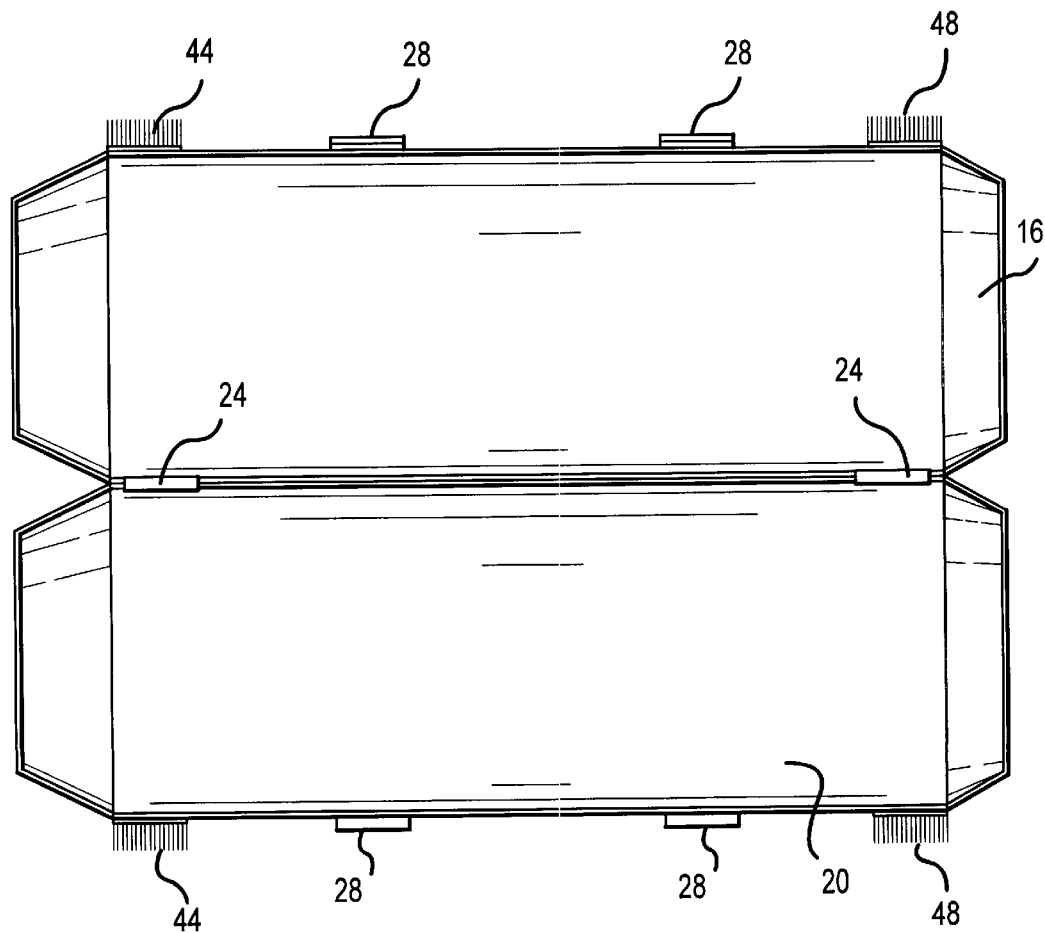
FIG. 2 illustrates a perspective view of the carrier illustrated in FIG. 1, in an open configuration.
Figure 3:
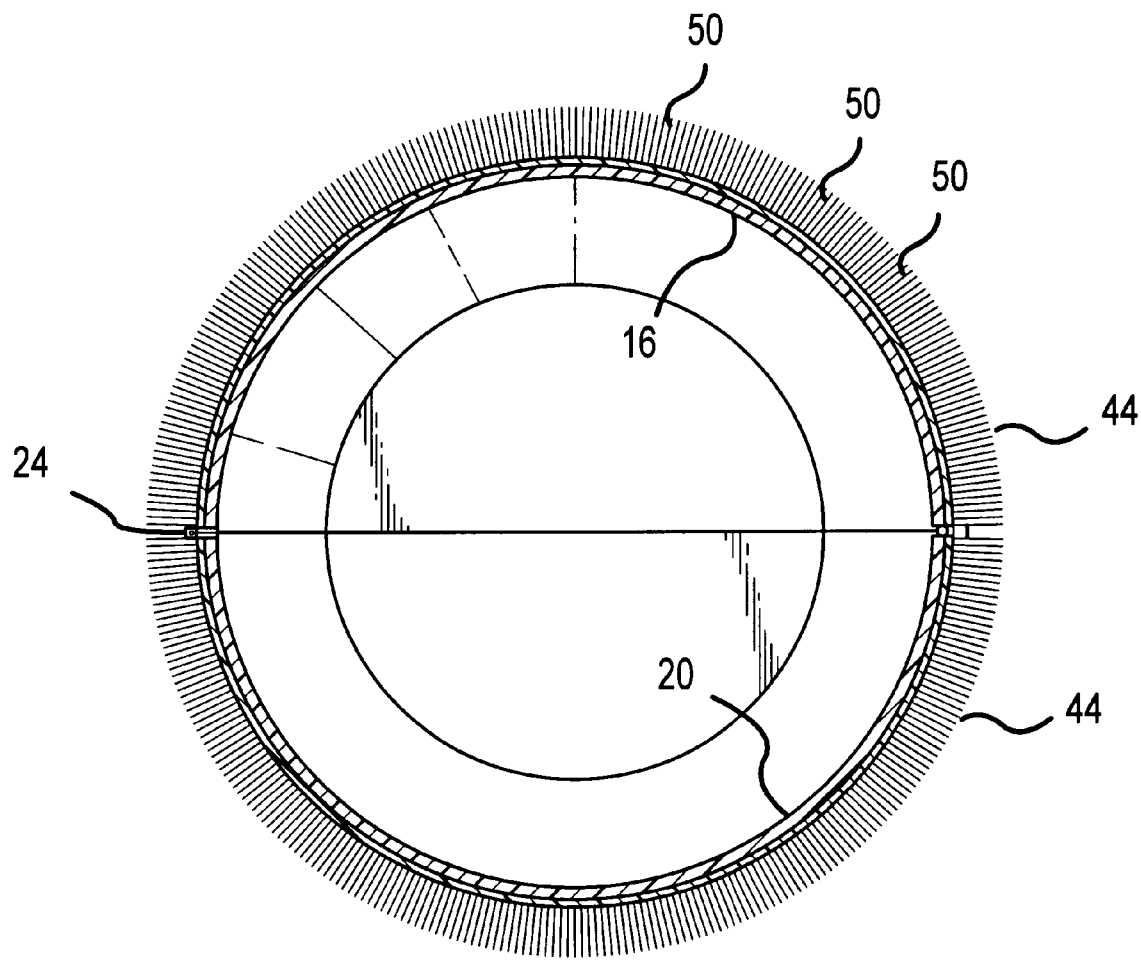
FIG. 3 is a cross-sectional view of the carrier illustrated in FIG. 1, taken along line 3—3.
Figure 4:
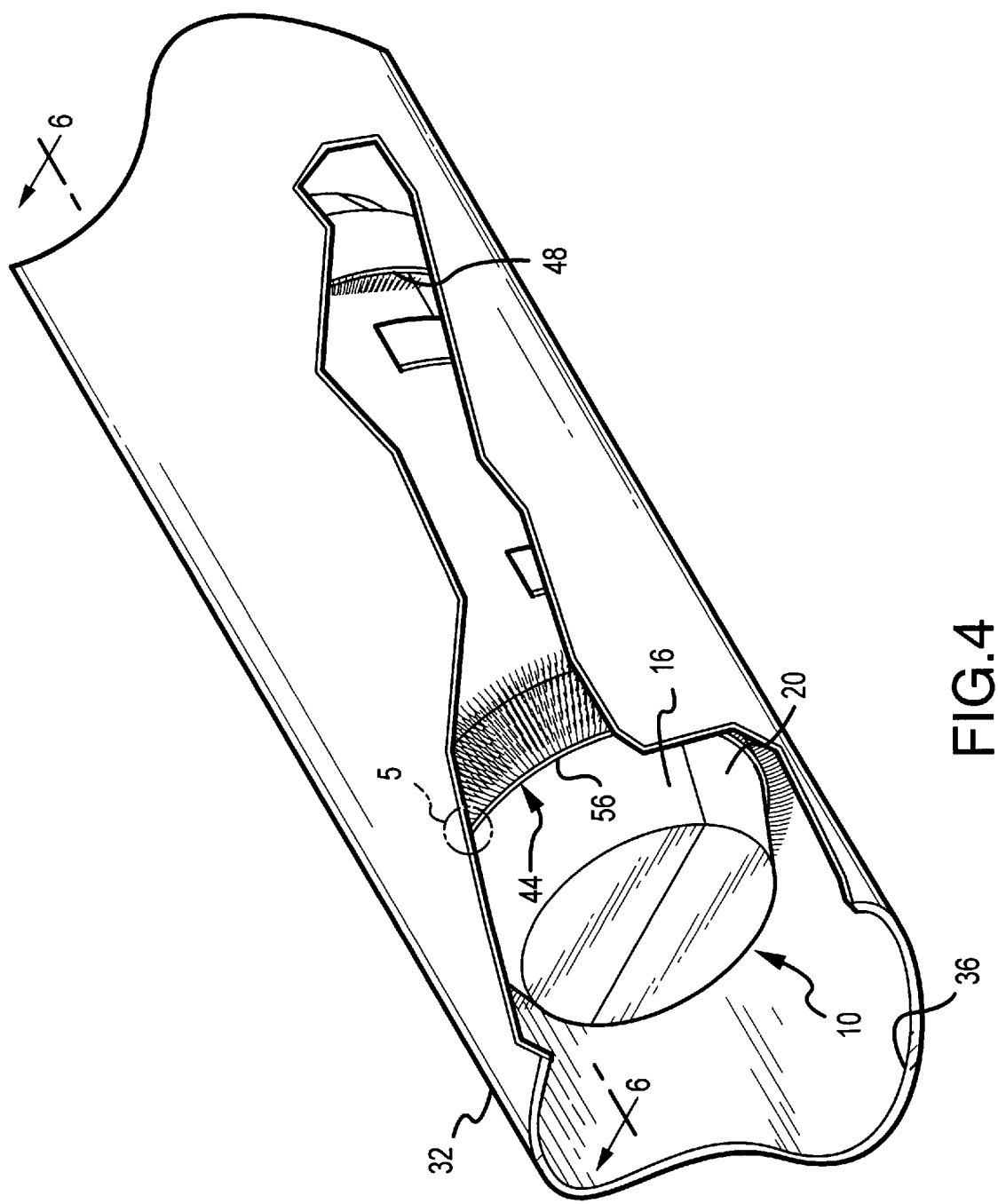
FIG. 4 is a perspective, partially cut-away view of the carrier of the present invention positioned within a first tube of a pneumatic tube transport system.

FIGS. 1–7 illustrate the various features of the carrier of the present invention. Generally, as illustrated in FIGS. 1–2, the carrier 10 of the present invention includes first and second shell members 16, 20, which are cylindrical in cross section for use in a correspondingly cylindrical tube transport system. The first and second shell members 16, 20 are pivotally interconnected to each other via hinges 24. Such hinges 24 allow the first and second shell members 16, 20 to pivot relative to each other to move the first and second shell members 16, 20 between closed and opened positions, substantially as shown in FIGS. 1–2. In this regard, and as illustrated in FIG. 2, the first and second shell members 16, 20 are movable relative to each other to an open configuration of the carrier 10, such that an object (not shown) can be positioned within the first and/or second shell member 16, 20 for delivery to another destination in the pneumatic tube transport system or retrieved upon reaching such destination. The first and second shell members 16, 20 are also movable relative to each other to a closed configuration to contain the object to be transported therebetween. The carrier 10 also includes latches 28 for securing the first shell member 16 to the second shell member 20 in the closed configuration, illustrated in FIG. 1. As such, an object contained within the carrier 10 may be transported upon closing and securing of the first shell 16 to the second shell 20. In this embodiment, the carrier 10, formed by the first and second shell members 16, 20, provides a substantially cylindrical carrier 10 for use in a pneumatic tube transport system having a plurality of cylindrical tubes.

For purposes of supporting the first and second shell members 16, 20 and any payload enclosed therebetween within a first tube 32 of a pneumatic tube transport system and for creating a motive force to move or propel the carrier 10 within the first tube 32 having inner and outer walls 36, 40, the first tube 32 being in fluid connection with a blower (not shown) of the pneumatic tube transport system, the carrier 10 further includes fore and aft seal bands 44, 48, illustrated in FIGS. 1–7. In accordance with the present invention, the seal bands 44, 48 are positionable on the first and second shell members 16, 20 at forward and rear portions thereof, about the circumference of the first and second shell members 16, 20. In accordance with the present invention, the first and second seal bands 44, 48 each include a plurality of stiff fibers 50 which are mounted on a rigid, but flexible backing strip 56.

Further, in one embodiment, each of the fibers 50 are mounted in the backing strip 56 such that each of the plurality of fibers 50 are perpendicular relative to a top surface 60 of the backing strip 56. In this regard, the plurality of fibers 50 are oriented parallel to each other. Further, for purposes of supporting the first and second shells 16, 20 and payloads contained therein while minimizing mass transfer between the fore and aft portions of the carrier 10, the plurality of fibers 50 are densely packed on the backing strip 56. In one embodiment, the first and second seal bands have a packing density of fibers 50 on the backing strip 56 of at least about 4000 fibers per square inch, or, more preferably, at least about 10,000 fibers per square inch, or, in a preferred embodiment, between about 20,000 fibers per square inch and about 100,000 fibers per square inch, the fibers 50 having a diameter of less than about 0.010 inch or, in a preferred embodiment, between about 0.003 inch and about 0.005 inch. While the fiber density, as defined by the amount of fibers mounted on the backing strip 56 per square inch, does not provide an airtight seal thereacross, the plurality of fibers 50 nevertheless provides sufficient flow resistance to create an effective pressure differential between the front portion of the carrier and the rear portion of the carrier 10.

Furthermore, the plurality of fibers 50 of the present invention are of substantially uniform height and are evenly distributed over the top surface 60 of the backing strip 56. Such uniformity in height and distribution of fibers 50 provides multiple contact points for supporting the carrier 10 and contents therein while traveling through the tube 32. More specifically, due to the uniform height and distribution of the plurality of fibers 50, each fiber is substantially equally loaded, as illustrated in FIGS. 5–7. As such, the seal bands 44, 48 do not wear unevenly; and thus, seal performance is not prohibitively degraded over time and use. In one embodiment, where the diameter of each fiber is less than about 0.010 inches, and more preferably, between about 0.003 inches and 0.005 inches, each fiber 50 has a height of less than about 1 inch, and more preferably, less than about 0.5 inch. In addition, the height of at least a first of the plurality of fibers 50 is within about 0.1 inch, and more preferably, within about 0.01 inch, and even more preferably, within about 0.001 inch, of the height of at least a second of the plurality of fibers 50.

As noted hereinabove, and as illustrated in FIG. 4–7, the first and second seal bands 44, 48 are frictionally engageable with the inner wall 36 of a first tube 32. During transport of the carrier 10 through the tube 32, the plurality of fibers 50 of the present invention evenly support the first and second shell members 16, 20. In this regard, end portions 52 of each fiber 50 define a plurality of points of contact for evenly supporting the first and second shell members 16, 20. As such, and in view of the uniform distribution of the plurality of fibers on the strip 56, loads on the plurality of fibers on the first and second bands 44, 48 are evenly shared among each fiber 50, whereby each fiber 50 is loaded to a value below its column buckling limit. In addition, since the end portions of each fiber 50 have a bulk coefficient of dynamic friction relative to the inner wall 36 of the tube 32 between about 0.01 and about 0.2, and in a preferred embodiment, between about 0.01 and about 0.1, the first and second seal bands 44, 48 do not adversely affect the amount of differential pressure required to move the carrier 10 through the tube 32. In this regard, the stiction force required to move the carrier 10 through the tube 32 is relatively low.

In one embodiment of the present invention, the plurality of fibers 50 are fabricated from a material having a modulus of elasticity of greater than about $1 \times 10^5$ psi. In this regard, the fibers 50 are fabricated from a stiff, durable material selected from the group consisting of silicon carbide, aluminum oxide, nylon, polypropylene, polyurethane, or any other similar material, such as ceramics, metals (e.g., steel, aluminum, etc.), or other plastics which can be made into short (e.g., less than one inch), thin (less than 0.010 inch diameter) fibers and which can be mounted into a backing or substrate in a density comparable to the density described hereinabove or in a density such that loading on each fiber is less than the critical buckling value. In this regard, the slenderness ratio is preferably less than about 300, and more preferably, less than about 200. Such fibers are commercially available from 3M, St. Paul, Minn.

In summary, each of the first and second seal bands 44, 48 for use on carriers 10 of the present invention includes a plurality of fibers 50, each of which is perpendicularly mounted and uniformly distributed on a backing strip 56 which is interconnectable to the first and second shell members 16, 20 via an adhesive or other mechanical fasteners. Due to the uniform distribution and height of the fibers 50, in combination with the density of fibers on the backing strip 56, loads from the first and second shells 16, 20 and payloads contained therein are uniformly spread over each fiber 50. This substantially uniform "surface" defined by the end portions 52 of the fibers 50 evenly supports the first and second shell members 16, 20 and payloads therein, if any. Advantageously, changes in payload do not significantly reduce the efficacy of the seal or increase friction between the fibers 50 and the inner wall 36 of the tube 32 since the load is evenly shared among the fibers 50, which are each loaded to a value below their column buckling value (e.g., $1 \times 10^{-4}$ pounds, for a fiber having a length of about 0.3 inch, a cross-sectional area of about $2 \times 10^{-5}$ square inches, and a modulus of elasticity of about $1 \times 10^5$ psi). As such, the seal bands 44, 48 tend to wear evenly and less dramatically than seal bands heretofore used, and do not tend to flatten out. As such, the quality of the seal provided by the plurality of fibers 50 remains adequate for purposes of providing sufficient flow resistance to create an effective pressure differential between the front and rear portions of the carrier 10 to move the carrier 10 through the tube 32.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A carrier for use in a tube transport system comprising a first tube, said carrier comprising:

a containment vessel which defines an enclosed space and which comprises a first access to said enclosed space;

at least one seal band interconnected with an outer surface of said containment vessel and encircling said containment vessel, wherein said at least one seal band comprises a plurality of fibers; and a first interface between any of said plurality of fibers which contact an inner surface of said first tube when said containment vessel is disposed in said first tube, wherein each said first interface consists essentially of a point contact, wherein said plurality of fibers of said least one seal band maintains at least an adjacent portion of said containment vessel in spaced relation to said inner surface of said first tube and supports said adjacent portion of said containment vessel within sad first tube, wherein said containment vessel is supported within said first tube solely by said plurality of fibers, and wherein a density of said plurality of fibers on said at least one seal band provides sufficient resistance to fluid flow through said plurality of fibers so as to advance said containment vessel through said first tube when said fluid flow is directed through said first tube.

2. A carrier, as claimed in claim 1, wherein each of said plurality of fibers has a slenderness ratio of less than about 300.

3. A carrier, as claimed in Claim 1, wherein each of said plurality of fibers is a single strand, said plurality of single strands being uniformly distributed about said at least one seal band.

4. A carrier, as claimed in claim 1, wherein said plurality of fibers are distributed on said at least one seal band at a packing density of at least about 4000 fibers per square inch.

5. A carrier, as claimed in claim 1, wherein each of said plurality of fibers has a diameter of less than about 0.010 inch and a height of less than about 0.5 inch.

6. A carrier, as claimed in claim 1, wherein each of said plurality of fibers has a length, wherein a variance of said lengths of said plurality of fibers is no more than about 0.1 inch.

7. A carrier, as claimed in claim 1, comprising:
   at least two of said seal bands, wherein said containment vessel has a longitudinal extent and wherein said at least two seal bands are longitudinally spaced on said containment vessel.

8. A carrier, as claimed in claim 1, wherein a design of each of sid plurality of fibers is such that each of said plurality of fibers is loaded below a column buckling limit associated therewith when said containment vessel is disposed in said first tube so as to be able to limit said first interface between said inner surface of said first tube and said plurality of fibers to said plurality of point contacts.

9. A carrier, as claimed in claim 1, wherein a material forming each of said plurality of fibers has a modulus of elasticity of at least about $1 \times 10^5$ pounds per square inch.

10. A carrier, as claimed in claim 1, wherein a density of said plurality of fibers on said at least one seal band is at least about 10,000 fibers per square inch, and wherein a diameter of each of said plurality fibers is between about 0.003 inches and about 0.005 inches.

11. A carrier, as claimed in claim 1, wherein a length of each of said plurality of fibers is less than about 0.5 inch with a slenderness ratio of less than about 300, wherein said slenderness ratio for a given said fiber is a ratio of said length of said given fiber to a radius of gyration of said given fiber.

12. A carrier, as claimed in claim 1, wherein each of said plurality of fibers has a bulk coefficient of dynamic friction relative to said inner surface of said first tube which is between about 0.01 and about 0.2.

13. A carrier, as claimed in claim 1, wherein said containment vessel is cylindrical.

14. A carrier, as claimed in claim 1, wherein said containment vessel comprises first and second shell members, wherein said carrier further comprises a hinge member which interconnects said first and second shell members for relative movement of said first and second shell members between open and closed positions for said containment vessel.

15. A tube transport system comprising:
   a first tube comprising inner and outer walls;
   a containment vessel which defines an enclosed space and which comprises a first access to said enclosed space, wherein said containment vessel is disposed within said first tube; and
   at least one seal band interconnected with an outer surface of said containment vessel and encircling said containment vessel, wherein said at least one seal band comprises a plurality of fibers, wherein said plurality of fibers of said least one seal band maintains an adjacent portion of said containment vessel in spaced relation to said inner wall of said first tube and supports said adjacent portion of said containment vessel within said first tube through a plurality of separate and discrete point contacts established by said plurality of fibers engaging said inner wall of said first tube, wherein said containment vessel is supported within said first tube solely by said plurality of fibers, wherein a design of each of said plurality of fibers is such that each of said plurality of fibers experiences a load which does not exceed a column buckling limit associated therewith so as to be able to limit an interface between said inner wall of said first tube and said plurality of fibers to said plurality of point contacts, and wherein a density of said plurality of fibers on said at least one seal band provides sufficient resistance to fluid flow through said plurality of fibers so as to advance said content vessel through said first tube when said fluid flow is directed through said first tube.

* * * * *

UNITED STATES PATENT AND TRADEMARK OFFICE
CERTIFICATE OF CORRECTION

PATENT NO. : 5,980,164

DATED : November 9, 1999

INVENTOR(S) : FRATELLO, Daniel A.

It is certified that error appears in the above-identified patent and that said Letters Patent is hereby corrected as shown below:

At Claim 8, Column 7, line 37, delete "sid" and insert --said--.

Signed and Sealed this

Sixteenth Day of May, 2000

Attest:

Q. TODD DICKINSON

*Attesting Officer*          *Director of Patents and Trademarks*